United States Patent [19]

Brophy et al.

[11] Patent Number: 5,020,314
[45] Date of Patent: Jun. 4, 1991

[54] MULTIPLE FLUID SPEED SYSTEMS

[75] Inventors: Sean P. Brophy, Ann Arbor; Richard D. Stephens, Brighton, both of Mich.

[73] Assignee: Williams International Corporation, Walled Lake, Mich.

[21] Appl. No.: 367,613

[22] Filed: Jun. 19, 1989

[51] Int. Cl.$^5$ ............................................. F02C 7/22
[52] U.S. Cl. ................................. 60/39.141; 60/734
[58] Field of Search ............... 60/39.141, 39.281, 734, 60/39.463; 137/513.3, 513.5, 568; 91/399, 400

[56] References Cited

U.S. PATENT DOCUMENTS

| | | | |
|---|---|---|---|
| 2,670,033 | 2/1954 | Ray | 60/39.141 |
| 2,804,241 | 8/1957 | McDowall et al. | 60/39.281 |
| 3,017,922 | 1/1962 | Peterson | 137/568 |
| 3,270,500 | 9/1966 | Williams | 60/39.281 |
| 3,318,091 | 5/1967 | Bader | 60/39.141 |
| 3,611,717 | 10/1971 | Tissier | 60/39.281 |
| 4,922,708 | 5/1990 | Nelson | 60/39.141 |

Primary Examiner—Louis J. Casaregola
Attorney, Agent, or Firm—Lyon & Delevie

[57] ABSTRACT

A multiple fluid feed system for, for example, a turbine engine, comprises a fuel tank, a fuel pump, and means for switching fuel flow from said pump between a return to tank condition and an engine supply condition. A starting fuel reservoir has a cylinder with a fuel inlet and a fuel outlet. A piston in the cylinder is movable from a start position to a run condition in response to movement of the switching means from the return to tank condition to the engine supply condition. A supply of starting fuel is disposed in the reservoir and is biased out of the reservoir upon initial movement of the piston.

2 Claims, 1 Drawing Sheet 5,020,314

MULTIPLE FLUID SPEED SYSTEMS

BACKGROUND OF THE INVENTION

This invention relates generally to feed of multiple fluids and more particularly to an improved starting fuel reservoir for use in the fuel system disclosed in application Ser. No. 305,163 filed Feb. 2, 1989, assigned to the assignee of the present invention.

There is a need for an improved multiple fluid fuel system that exhibits positive displacement of a starting fluid during turbine start-up and acceleration and uninhibited supply of run fuel thereafter. Such a multiple fluid fuel system preferably automatically purges the fuel lines of accumulated vapor and air, prior to engine rotation.

SUMMARY OF THE INVENTION

A multiple fluid feed system in accordance with the instant invention is shown in the environment of a turbine engine fuel system comprising a brushless D.C. Motor that concomitantly drives a fixed displacement fuel pump and a fixed displacement metering pump. The D.C. motor provides for variable speed operation of the fixed displacement pumps. The rate of fuel delivery to the engine is controlled by a computer which is adapted to sense a plurality of engine parameters, such as compressor discharge pressure, shaft speed and inlet temperature. The computer applies a signal to the motor which, based on the displacement of the metering pump, is indicative of optimum fuel flow and is determinative of the speed of the motor. The fuel pump and the metering pump may be mounted in or near the main fuel tank since they are driven by the single brushless D.C. motor. The boost pump provides fuel pressure and is of larger displacement than the metering pump. The excess fuel delivered by the boost pump is shunted back to the tank by the pressure regulator to maintain the pressure differential across the metering pump at a small value to ensure that the effect of internal leakage on its delivery is minimized.

Flow from the metering pump is initially shunted back to tank through a computer controlled recirculation valve. Thus, minimum back pressure is presented to the pumps to permit rapid acceleration thereof. Closure of the recirculation valve results in the instantaneous application of full fuel flow and pressure to a novel starting fuel reservoir that effects positive displacement of a starting fluid to the engine ahead of the run fuel flow. A recirculation valve just prior to the starting fuel reservoir permits purging of all fuel lines and components prior to engine rotation and ensures accurate metering during the critical start phase of the engine. Moreover, the disclosed system can be remotely mounted and therefore does not require a gear box mount and drive pad on the engine.

DETAILED DESCRIPTION OF THE PREFERRED EMBODIMENT OF THE INVENTION

Figure 1:
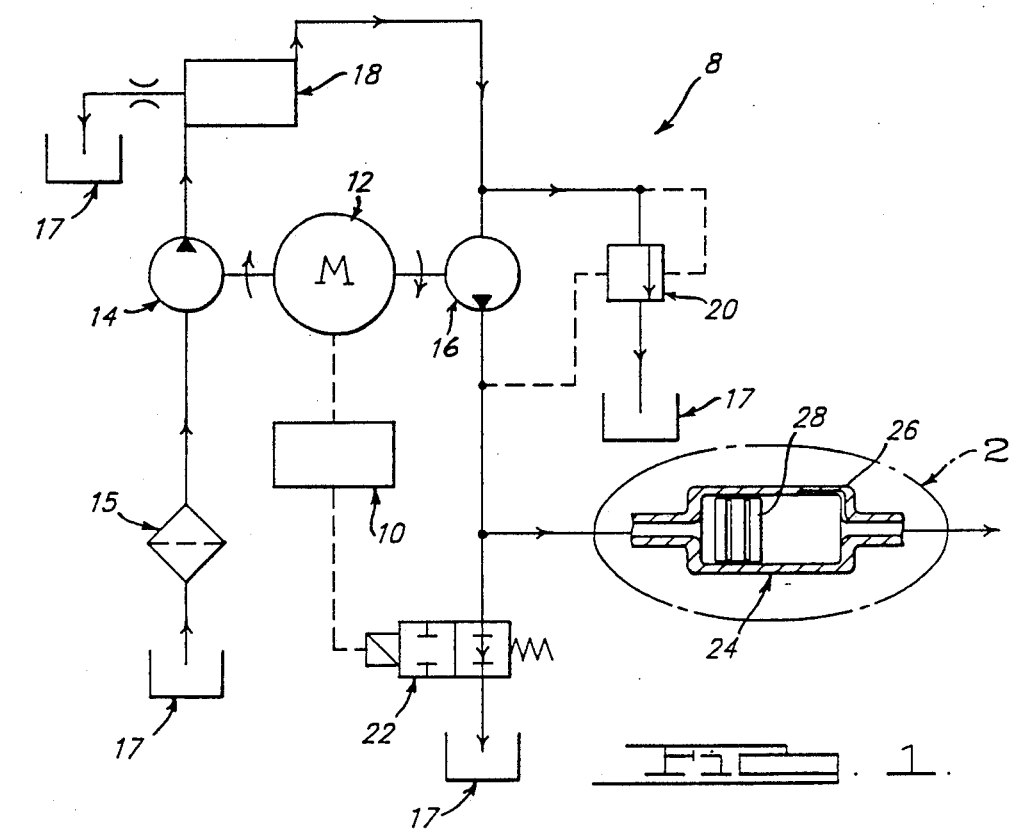
FIG. 1 is a simplified block diagram of a fuel system according to the invention.
Figure 2:
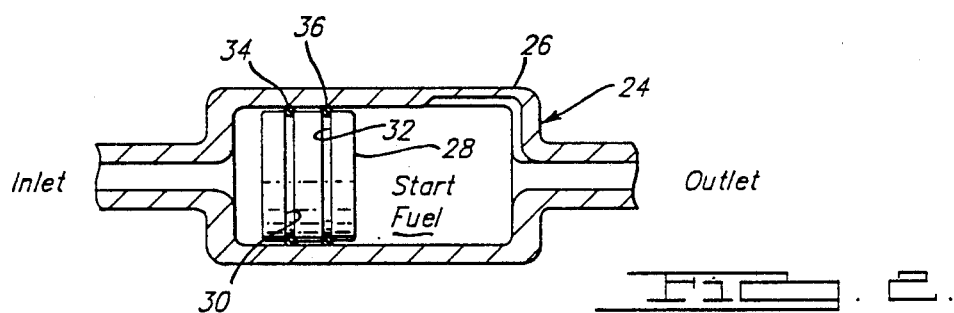
FIG. 2 is an enlarged view taken within the circle 2 of FIG. 1.
Figure 3:
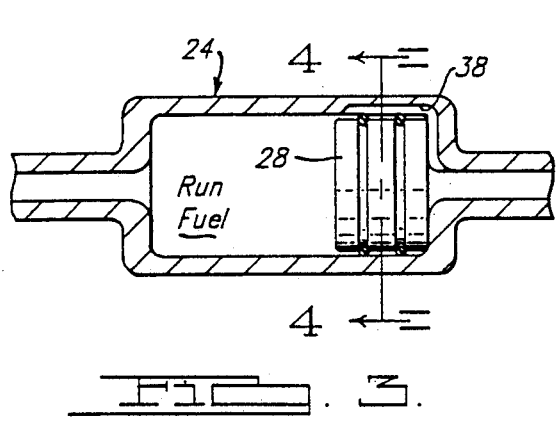
FIG. 3 is a view similar to FIG. 2 at the end of the starting phase of an engine.
Figure 4:
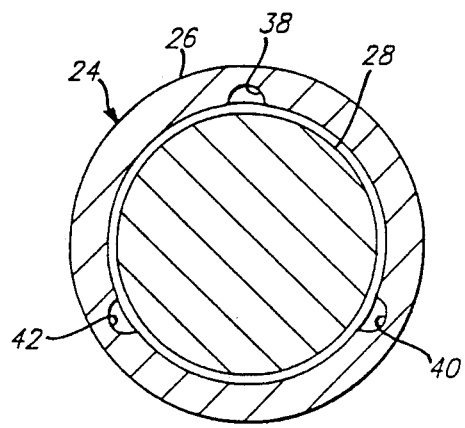
FIG. 4 is a view taken along the line 4—4 of FIG. 3.

Referring to FIG. 1, a fuel system 8 comprises an electronic computer 10 which controls the speed of a brushless D.C. electric motor 12. The motor 12 drives both a positive displacement boost pump 14 and a positive displacement metering pump 16. The boost pump 14 is in series flow relationship with a fuel filter 15 and, fuel tank 17. A vapor separator 18, and differential pressure regulator 20 are disposed between the boost pump 14 and the metering pump 16. The metering pump 16 functions to control the flow of fuel, which has been pressurized by the positive displacement boost pump 14 to a level appropriate for delivery to the turbine engine, as determined by the computer 10. Fuel metered by the metering pump 16 flows to a multiple position electronically controlled recirculation valve 22. The valve 22, prior to a start signal from the computer 10, is open so as to shunt fuel back to the tank 17. In this condition, no fuel pressure is applied on starting fluid contained in a starting fuel reservoir 24.

In accordance with the present invention, the starting fuel reservoir 24 comprises a cylinder 26 having a freely movable piston 28 therein. The piston 28 is provided with grooves 30 and 32 for the acceptance of conventional O-rings 34 and 36, respectively. It is to be noted that the O-rings 34 and 36 serve the dual function of retaining the piston 28 against initial movement relative to the cylinder 26 in the absence of fuel pressure and retaining the piston 28 in the run condition after advancement thereof.

The cylinder 26 is provided with a plurality of longitudinal grooves 38, 40 and 42 at the downstream end thereof that conduct run fuel past the piston 28 after advancement thereof.

In operation, after receipt of a start signal from the computer 10, the boost pump 14 and the metering pump 16 are energized, rapidly bringing fuel flow to a maximum condition due to the fact that the recirculation valve 22 is in the shunt condition permitting fuel flow to tank 17 thereby eliminating back pressure on the pumps 14 and 16. While pump speed is rapidly maximized, the fuel lines are purged of air. When the desired start parameters are met as sensed by the computer 10 the valve 22 is closed applying full fuel pressure to the tank side of the piston 28 of the starting fuel reservoir 24 effecting advancement thereof and movement of a slug of highly volatile starting fuel in the reservoir 24 to the engine (not shown).

While the preferred embodiment of the invention has been disclosed, it should be appreciated that the invention is susceptible of modification without departing from the scope of the following claims.

We claim:

1. In a fuel system for supplying a run fuel and a different start fuel to a turbine engine, said fuel system comprising a fuel tank, a run fuel pump, and means for switching run fuel flow from said pump between a return to tank condition and an engine supply condition, the improvement comprising a starting fuel reservoir comprising a cylinder having a fuel inlet directly connected to said run fuel pump and a fuel outlet directly connected to said engine, a piston in said cylinder movable from a start position to a run condition in response to movement of said switching means from the return to tank condition to the engine supply condition, and a supply of starting fuel in said reservoir on an engine side of said piston, said starting fuel being biased out of said reservoir upon movement of said piston toward the run condition.

2. The fuel system of claim 1 wherein said cylinder has a plurality of longitudinally extending grooves spaced radially outwardly from said piston and communicating with said fuel pump and said engine for shunting fuel past said piston when said system is in the run condition.

* * * * *